US009250088B1

(12) United States Patent
Kozolchyk et al.

(10) Patent No.: US 9,250,088 B1
(45) Date of Patent: *Feb. 2, 2016

(54) DISCOVERY OF PUBLIC POINTS OF INTEREST

(71) Applicant: Amazon Technologies, Inc., Reno, NV (US)

(72) Inventors: Jonathan Kozolchyk, Seattle, WA (US); Darren E. Canavor, Redmond, WA (US); Blake P. Hess, Renton, WA (US); Jeffrey J. Fielding, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,205

(22) Filed: Oct. 2, 2013

Related U.S. Application Data

(63) Continuation of application No. 13/474,047, filed on May 17, 2012, now Pat. No. 8,566,014.

(51) Int. Cl.
*G05D 1/02* (2006.01)
*G01C 21/26* (2006.01)

(52) U.S. Cl.
CPC .................................... *G01C 21/26* (2013.01)

(58) Field of Classification Search
CPC .............................. G01C 21/00; G01C 21/34
USPC .................................. 701/300, 426, 468, 438
See application file for complete search history.

(56) References Cited

U.S. PATENT DOCUMENTS

| | | | |
|---|---|---|---|
| 6,785,594 B1 | 8/2004 | Bateman et al. | |
| 6,826,472 B1 | 11/2004 | Kamei et al. | |
| 7,076,505 B2 | 7/2006 | Campbell | |
| 8,566,029 B1 * | 10/2013 | Lopatenko et al. | 701/426 |
| 8,589,069 B1 * | 11/2013 | Lehman | 701/438 |
| 2009/0005987 A1 * | 1/2009 | Vengroff et al. | 701/300 |
| 2011/0301832 A1 | 12/2011 | Zheng et al. | |

* cited by examiner

*Primary Examiner* — Thomas G Black
*Assistant Examiner* — Luke Huynh
(74) *Attorney, Agent, or Firm* — Thomas | Horstemeyer, LLP

(57) ABSTRACT

Disclosed are various embodiments for discovery of public points of interest. Data identifying points of interest is obtained. Each point of interest is associated with a respective user and specifies a respective name and a respective geographic location. A public point of interest is determined based at least in part on a similarity of the respective names of a subset of the points of interest, a proximity of the respective geographic locations of the subset of the points of interest, and a number of different users associated with the subset of the points of interest.

20 Claims, 8 Drawing Sheets

DISCOVERY OF PUBLIC POINTS OF INTEREST

CROSS-REFERENCE TO RELATED APPLICATIONS

This application is a continuation of, and claims priority to, co-pending U.S. Patent Application entitled "DISCOVERY OF PUBLIC POINTS OF INTEREST," filed on May 17, 2012, and assigned application Ser. No. 13/474,047, which is incorporated herein by reference in its entirety.

BACKGROUND

In the geolocation space, a point of interest (POI) is a specific physical place that is of interest to a general population. The POI may be attached to a street address, latitude and longitude coordinates, and/or other location identifiers. Databases of POIs may be commercially available from data providers.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to discovery of public points of interest (POI) through the identification of personal POIs. A personal POI is a POI that is of interest to a specific individual. A user may register a personal POI by way of a networked check-in application executed in a smartphone or other mobile device. While at a particular location, the user may "check-in" and provide the coordinates of the location and a description or identification of the location. Alternatively, the user may access a network site and manually specify locations and identifications of personal POIs, e.g., relative to a map, by street address, etc.

Various embodiments of the present disclosure may discover new public POIs based at least in part on the creation of private or personal POIs at the same location by multiple users. Thresholds (e.g., number of check-ins, number of unique users, distance between different check-in locations, etc.) may be employed to confirm the existence of a public POI using the multiple private POIs at the same location. In some embodiments, existence of a public POI may be confirmed through manual review of private POIs. In some cases, ephemeral POIs may be identified, and larger POIs may be inferred though identification of multiple POIs in an area.

Existing public POIs may be enhanced with metadata generated based at least in part on the personal POIs. Non-limiting examples of such metadata may include hours of operation, days of operation, goods or services provided at the POI, behavior data associated with users who frequent the POI, and so on. Existing POIs may be updated or removed based at least in part subsequent user check-ins. In the following discussion, a general description of the system and its components is provided, followed by a discussion of the operation of the same.

Figure 1:
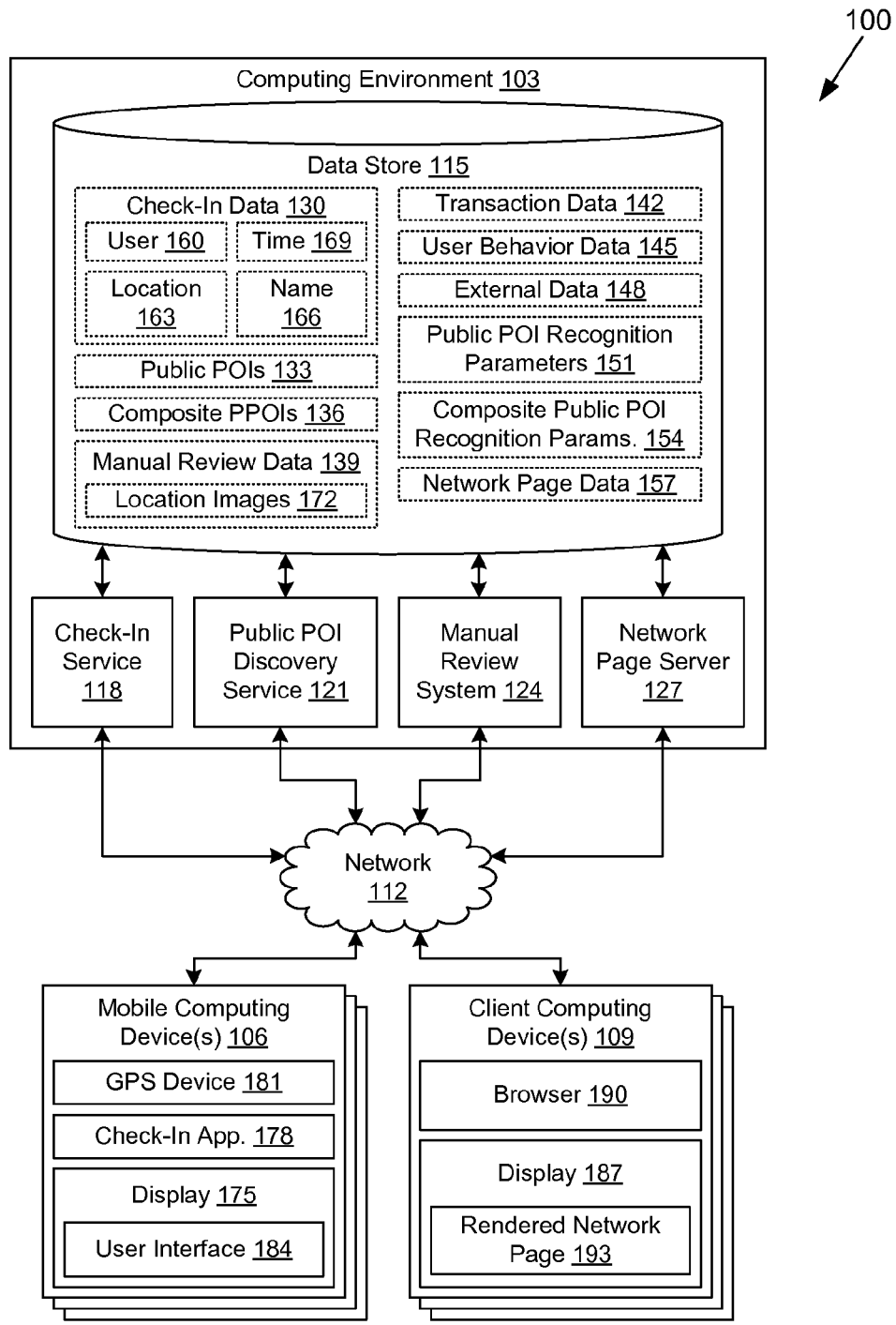
FIG. 1 is a drawing of a networked environment according to various embodiments of the present disclosure.

With reference to FIG. 1, shown is a networked environment 100 according to various embodiments. The networked environment 100 includes a computing environment 103 in data communication with one or more mobile computing devices 106 and one or more client computing devices 109 by way of a network 112. The network 112 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a computing device such as a server computer or any other system providing computing capability. Alternatively, a plurality of computing devices may be employed that are arranged, for example, in one or more server banks or computer banks or other arrangements. For example, a computing environment 103 may comprise a cloud computing resource, a grid computing resource, and/or any other distributed computing arrangement. The computing environment 103 may include computing devices that may be located in a single installation or may be distributed among many different geographical locations.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed in the computing environment 103, for example, include a check-in service 118, a public POI discovery service 121, a manual review system 124, a network page server 127, and other applications, services, processes, systems, engines, or functionality not discussed in detail herein. The check-in service 118 is executed to obtain check-in information from users at mobile computing devices 106 and/or client computing devices 109, where the check-in represents a visit by a user to a business, a park, a library, a school, a government agency, and/or other location. One or more check-ins at a location may be considered to indicate a personal POI for the user at the location. The check-in information may include, for example, a name, a geographic location, a genre or type of location, a time associated with the visit, and/or other information.

The public POI discovery service 121 is executed to examine the check-in information to discover public POIs from personal POIs. Various thresholds and/or other configuration parameters may control how public POIs are determined from the personal POIs. For example, a grouping of similar personal POIs may be determined from the check-in information according to similarity of names, proximity of geographic locations, time of check-in, and/or other information. The grouping may be converted or promoted from a potential public POI to a public POI based at least in part on a number of different users who have specified the personal POIs at the location. Also, a potential public POI may be submitted to the manual review system 124 for a manual review. In various embodiments, the public POI discovery service 121 may be configured to infer the existence of composite public POIs from different public POIs that have been determined in an area. In some embodiments, the public POI discovery service 121 may be configured to enrich existing public POIs with additional or corrected metadata.

The manual review system 124 is configured to facilitate manual reviews of potential public POIs and/or potential composite public POIs. The manual reviews may be undertaken by agents such as employees, independent contractors, and/or others. In one embodiment, the manual review system 124 is configured to offer discrete tasks to independent contractors for compensation on a per-task basis. The independent contractors may be qualified, for example, using a reputation with the manual review system 124. In some cases, the work of some or all of the independent contractors may be verified by others to assess or ensure accuracy.

The network page server 127 may correspond to a commercially available hypertext transfer protocol (HTTP) server such as, for example, APACHE HTTP Server, APACHE TOMCAT, MICROSOFT Internet Information Services (IIS), etc. The network page server 127 may be configured to serve up a network-page-based interface for the check-in service 118, the manual review system 124, and/or other components executed in the computing environment 103. The network pages may correspond to web pages, gopher pages, mobile application screens, and/or other forms of network content.

The data stored in the data store 115 includes, for example, check-in data 130, public POIs 133, composite public POIs 136, manual review data 139, transaction data 142, user behavior data 145, external data 148, public POI recognition parameters 151, composite public POI recognition parameters 154, network page data 157, and potentially other data. The check-in data 130 includes, for each check-in, an identification of a user 160, a geographic location 163, a name 166, a time 169, genre or category, a textual description, and/or other data. The user 160 corresponds to one of a plurality of users who may be registered or configured to provide check-ins or to specify personal POIs. The location 163 may correspond to latitude and longitude coordinates, a street address, and/or other types of geographic locations. The name 166 may correspond to a user specified or selected name for the personal POI identified in the check-in. The time 169 may correspond to a date and time, time stamp, or other time identification.

The public POIs 133 correspond to public POIs or potential public POIs that have been determined by the public POI discovery service 121. Each of the public POIs 133 may be associated with a representative name, a representative location, a representative description, and/or other data that may be determined by the public POI discovery service 121. The public POIs 133 may also be associated with certain hours of operation, days of operation, and/or other periodic time window of operation as determined through the times 169 of the check-in data 130. Further, the public POIs 133 may be associated with busy periods, relatively slow periods, etc. also determined from the times 169 of the check-in data 130.

The composite public POIs 136 correspond to composite public POIs or potential composite public POIs that have been determined by the public POI discovery service 121 from a plurality of different public POIs 133 and/or check-in data 130 associated with different public POIs 133. For example, the composite public POIs 136 may correspond to art fairs, shopping malls, farmers' markets, special events, and so on that may represent a composite of many different public POIs 133. Such composite public POIs 136 may be permanent or ephemeral (e.g., a POI of a temporary nature). Also, such composite public POIs 136 may be periodic in nature such as, for example, a farmers' market that takes place every other weekend.

Each of the composite public POIs 136 may be associated with a representative name, a representative location, a representative description, and/or other data that may be determined by the public POI discovery service 121. The composite public POIs 136 may also be associated with certain hours of operation, days of operation, and/or other periodic time window of operation as determined through the times 169 of the check-in data 130. Further, the composite public POIs 136 may be associated with busy periods, relatively slow periods, etc. also determined from the times 169 of the check-in data 130.

The manual review data 139 includes data relating to the facilitation of manual review by the manual review system 124. The manual review data 139 may include manual review thresholds for identifying potential public POIs 133 and potential composite public POIs 136 that may not be confidently determined. The manual review data 139 may also include criteria for flagging certain potential POIs 133 and composite public POIs 136 for manual review (e.g., keywords, locations, etc.). In some embodiments, location images 172 may be provided for manual review in conjunction with a name 166 or other data obtained from the check-in data 130. This allows an agent to confirm whether a POI with a certain name 166 is in fact depicted in the location image 172 for the given location 163. In one embodiment, a task provided by the manual review system 124 may direct an agent to capture a location image 172 at a certain location 163 for purposes of POI confirmation.

The transaction data 142 may correspond to data indicating payment instrument swipes or other transactions associated with various business entities. The transaction data 142 may be correlated with the check-in data 130 to assist in determining or validating a public POI 133 or composite public POI 136. In other words, the transaction data 142 may be evaluated to determine the types of transactions associated with the location to identify, or validate a previous identification for, a POI.

The user behavior data 145 may include various data associated with the users 160 who are performing the check-ins. For example, the user behavior data 145 may include a purchase history with one or more merchants, a browsing history for one or more network sites, a search history for one or more search engines, explicitly defined user preferences, a previous check-in history at known public POIs 133 or composite public POIs 136, and/or other behavior data. The user behavior data 145 may be used, for example, as part of inferring the existence of a composite public POI 136.

The external data 148 may include reference data that may be used by the public POI discovery service 121 in determining public POIs 133 or composite public POIs 136. To this end, the external data 148 may include valid business names, valid locations, valid descriptions, valid periods of operation, and so on. In some cases, the external data 148 may be used to validate potential public POIs 133 or potential composite public POIs 136. In one embodiment, the external data 148 may be obtained by way of the network 112 from one or more external data providers.

The public POI recognition parameters 151 include various criteria, thresholds, and parameters that control recognition of public POIs 133 from the check-in data 130 by the public POI discovery service 121. For example, the public POI recognition parameters 151 may include a similarity threshold for a measure of similarity between the names 166 of check-ins, a proximity threshold for a measure of proximity between the locations 163 of check-ins, a quantity threshold for a number of unique users 160 for check-ins, and so on.

The composite public POI recognition parameters 154 include various criteria, thresholds, and parameters that control recognition of composite public POIs 136 from the check-in data 130 and/or public POIs 133 by the public POI discovery service 121. For example, the composite public POI recognition parameters 154 may include a similarity threshold for a measure of similarity between the names of public POIs 133, a proximity threshold for a measure of proximity between the locations of public POIs 133, thresholds for application of transaction data 142, user behavior data 145, and so on.

The network page data 157 may include images, text, code, graphics, hypertext markup language (HTML), extensible markup language (XML), audio, video, and/or other data used by the network page server 127 and/or other applications in the computing environment 103 to generate network pages. Such network pages may facilitate interaction with the manual review system 124, the check-in service 118, and/or other applications.

The mobile computing device 106 is representative of a plurality of mobile client devices that may be coupled to the network 112. The mobile computing device 106 may comprise, for example, a processor-based system such as a computer system. Such a computer system may be embodied in the form of a laptop computer, personal digital assistants, cellular telephones, smartphones, music players, web pads, tablet computer systems, electronic book readers, or other devices with like capability. The mobile computing device 106 may include a display 175. The display 175 may comprise, for example, one or more devices such as liquid crystal display (LCD) screens or other types of display devices, etc.

The mobile computing device 106 may be configured to execute various applications such as a check-in application 178 and/or other applications. The check-in application 178 may be executed to "check-in" at a particular location, thereby sending data to the check-in service 118 by way of the network 112. The check-in application 178 may acquire the current location from a global positioning system (GPS) device 181 or other location-finding device. In other embodiments, the current location may be determined through triangulation using cell towers, geolocation based upon internet protocol (IP) address, and/or other approaches. The check-in application 178 may prompt the user to provide a name, description, category, and/or other information to be provided to the check-in service 118. The check-in application 178 and/or other applications may render a user interface 184 on the display 175. The mobile computing device 106 may be configured to execute applications beyond the check-in application 178 such as, for example, browser applications, email applications, social networking applications, and/or other mobile applications.

The client computing device 109 is representative of a plurality of client devices that may be coupled to the network 112. The client computing device 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 109 may include a display 187. The display 187 may comprise, for example, one or more devices such as cathode ray tubes (CRTs), liquid crystal display (LCD) screens, gas plasma-based flat panel displays, LCD projectors, or other types of display devices, etc.

The client computing device 109 may be configured to execute various applications such as a browser 190 and/or other applications. The browser 190 may be executed in a client computing device 109, for example, to access and render network pages, such as web pages, or other network content served up by the computing environment 103 and/or other servers, thereby generating a rendered network page 193 on the display 187. The client computing device 109 may be configured to execute applications beyond the browser 190 such as, for example, mobile applications, email applications, instant message applications, and/or other applications.

Next, a general description of the operation of the various components of the networked environment 100 is provided. To begin, users may register with the check-in service 118 and/or install a check-in application 178 to their mobile computing devices 106. In a first case, a user travels to a location and "checks-in" using the check-in application 178 on the mobile computing device 106. The check-in application 178 prompts the user to enter metadata about the location, e.g., name 166, etc. The check-in application 178 determines the current location by way of the GPS device 181 or other device. After all of the data is collected, the check-in application 178 may submit the various data, e.g., including an identification of the user 160, the location 163, the name 166, the current time 169, etc., to the check-in service 118 by way of the network 112. The check-in service 118 then stores the data as check-in data 130.

In a second case, a user at a client computing device 109 may enter a check-in using a browser 190 that provides one or more rendered network pages 193 for display. The rendered network pages 193 may include one or more forms to elicit metadata about the location, e.g., name 166, the time 169, the location 163, etc. In one embodiment, to specify the location 163, the user may be presented with a map. The user may then indicate the location 163 relative to the map. For example, the user may navigate to a general area and click on the map to select a particular location 163. Alternatively, the user may manually specify a street address or other indication for the location 163. The data may be sent to the check-in service 118 by way of the network page server 127 and the network 112. In some cases, check-ins may be incentivized with discounts at a merchant, a desirable standing accorded within a social network, recognition of meeting certain check-in goals, and/or other incentives.

Although the check-in data 130 has been described as the result of a user explicitly "checking in," deliberate user interaction is not a requirement. For example, a mobile computing device 106 may be configured to automatically check-in at periodic intervals, when the location of the mobile computing device 106 is changed, and/or at other times. Further, the check-in data 130 may include non-consumer check-ins. For example, a delivery person may check-in at various locations during the course of performing deliveries.

In response to the check-in data 130 being collected, the public POI discovery service 121 may be executed on demand or periodically. The public POI discovery service 121 analyzes the check-in data 130 corresponding to personal POIs to determine potential public POIs 133. The public POI discovery service 121 may examine the personal POIs indicated by the check-in data 130 to determine groupings or subsets of the personal POIs that may correspond to public POIs 133. For example, personal POIs having similar or same names 166, similar or same locations 163, and/or other metadata may be considered as possible public POIs 133. The names 166 and/or locations 163 may be verified against external data 148 to exclude private or non-public types of check-ins (e.g., homes, etc.), check-ins with fake or inappropriate metadata, check-ins relating to predefined locations or names that are protected against automatic creation of public POI 133, and so on.

Public POIs 133 may correspond, for example, to a proper name for a location or an activity name for a location. As a non-limiting example of an activity-focused POI, if users of mobile computing devices 106 tend to check-in in a certain area often and read books through an electronic book reader application often in that area, the public POI discovery service 121 may determine that the public POI 133 is a "Reading Spot." In one embodiment, the mobile computing devices 106 may be configured to check in automatically without the user explicitly providing a name. The public POI discovery service 121 may infer the name "Reading Spot" from the user activity frequently performed at the location, which may be a park, library, coffee shop, etc. Accordingly, user behavior data 145 which indicates user activities at particular locations 163 may be used to determine public POIs 133. The user behavior data 145 may also be employed to determine why users 160 are at a certain POI, for example, if they are at a stadium for a hockey game or for a business leadership expo. The activity performed at the POI may be used in creating a public POI 133.

Various thresholds or criteria in the public POI recognition parameters 151 may be consulted to group personal POIs and filter out false public POIs 133. For example, the locations 163 of the check-ins may be need to be within a certain distance or the names 166 may need to have a certain number of words in common, a certain number of different users 160 may need to check in at the same or similar location 163 with a same or similar name 166, and so on. Once a public POI 133 has been recognized, it may be stored in the public POIs 133. The public POI 133 may be associated with a representative location, a representative name, and/or other representative metadata, which may be determined in part from the user-supplied check-in data 130. The public POIs 133 may be made publicly available in maps, application data, search engines, and so on. The public POIs 133 may be used in making localized offers to potential customers.

Under some conditions (e.g., upon a potential public POI 133 having a confidence measure meeting a manual review threshold), potential public POIs 133 may be submitted to the manual review system 124 for manual review. Agents may log into the manual review system 124 and may be assigned various tasks to perform. The agents may perform various sanity checks on the data, e.g., does the potential public POI 133 have a name that makes sense, is the name inappropriate, and so on. In some cases, multiple agents may perform one or more of the tasks for a given potential public POI 133 to ensure data quality.

A location image 172 from a reference source or other source may be provided for an agent to verify existence of the public POI 133. If the location image 172 shows a tank farm and the potential public POI 133 has a name of "Joe's Restaurant," the agent may decide not to confirm the listing. In some embodiments, agents may be directed to take pictures or acquire the location images 172 for particular locations 163 for verification purposes. Such tasks may be directed to agents based at least in part on a current location of the agent. In some embodiments, the public POI discovery service 121 may perform some automated verification of the location image 172 relative to the potential public POI 133 data (e.g., optical character recognition of proposed or valid names, etc.).

The public POIs 133 may have a temporal aspect. The public POI discovery service 121 may determine normal periods of operation for the public POIs 133 (e.g., hours of operation, days of operation, seasons of operation, etc.) based at least in part on analysis of the times 169 of the check-in data 130. With enough check-in data 130, the public POI discovery service 121 may be able to discern a temporal pattern in the times 169 for visits to a given POI. Similarly, if the check-ins abruptly cease, the public POI discovery service 121 may discern that the public POI 133 no longer exists, has moved, or has temporarily closed. Whether a public POI 133 no longer exists, has moved, or has temporarily closed may be verified in some cases by a manual review.

As one example, a public POI 133 may correspond to a mobile business, such as a mobile food truck which may move to predefined locations according to a schedule. The public POI discovery service 121 may infer the schedules and locations for the mobile business from the check-in data 130. To this end, the public POI discovery service 121 may determine a corresponding representative geographic location for the public POI 133 for each of a plurality of time periods. As another example, if check-ins occur only on the first Tuesday of the month, the public POI discovery service 121 may infer a period of operation for the public POI 133. In some cases, the existence of a public POI 133 may be determined based at least in part on a time window encompassing the respective times 169 for a grouping of check-ins.

In various embodiments, the public POI discovery service 121 may be configured to infer the existence of composite public POIs 136 from check-in data 130 or public POIs 133. The public POI discovery service 121 may also infer the existence of composite public POIs 136 from check-ins to manually configured or imported public POIs 133 in the system. When certain types of public POIs 133 are together, a composite public POI 136 may be inferred. For example, when many different arts and crafts vendors are within a certain area, the existence of an art fair may be inferred. Likewise, when many mall-type merchants are within a certain area, the existence of a shopping mall may be inferred.

The public POI discovery service 121 may base an inference for a composite public POI 136 on various other data besides check-in data 130, such as transaction data 142, user behavior data 145, external data 148, and so on. The transaction data 142 may indicate the types of merchants or transactions associated with certain locations or areas, and the types that are indicated may be used in determining composite public POIs 136. The user behavior data 145 may indicate the types of users 160 who are checking in to a certain area and their affinities for art fairs, farmers' markets, music concerts, and/or other types of composite public POIs 136. The external data 148 may be used to validate the existence of an event or other type of composite public POI 136 or to obtain further details. Like the public POIs 133, potential composite public POIs 136 may also be submitted for manual review in some cases.

Various thresholds or criteria in the composite public POI recognition parameters 154 may be consulted to group public POIs 133 and filter out false composite public POIs 136. For example, the locations of the public POIs 133 may need to be within a certain distance, and so on. Once a composite public POI 136 has been recognized, it may be stored in the composite public POIs 136. The composite public POI 136 may be associated with a representative location, a representative name, and/or other representative metadata, which may be determined in part from the user-supplied check-in data 130. In various scenarios, the representative locations, names, and/or other data may be automatically generated from external data 148, automatically generated from check-in data 130, elicited by a manual review task, and so on. The composite public POIs 136 may be made publicly available in maps, application data, search engines, and so on. The composite public POIs 136 may be used in making localized offers to potential customers.

Like the public POIs 133, the composite public POIs 136 may also have a temporal aspect. The public POI discovery service 121 may determine normal periods of operation for the composite public POIs 136 (e.g., hours of operation, days of operation, seasons of operation, etc.) based at least in part on analysis of the times 169 of the check-in data 130 and/or times 169 associated with the public POIs 133.

Figure 2A:
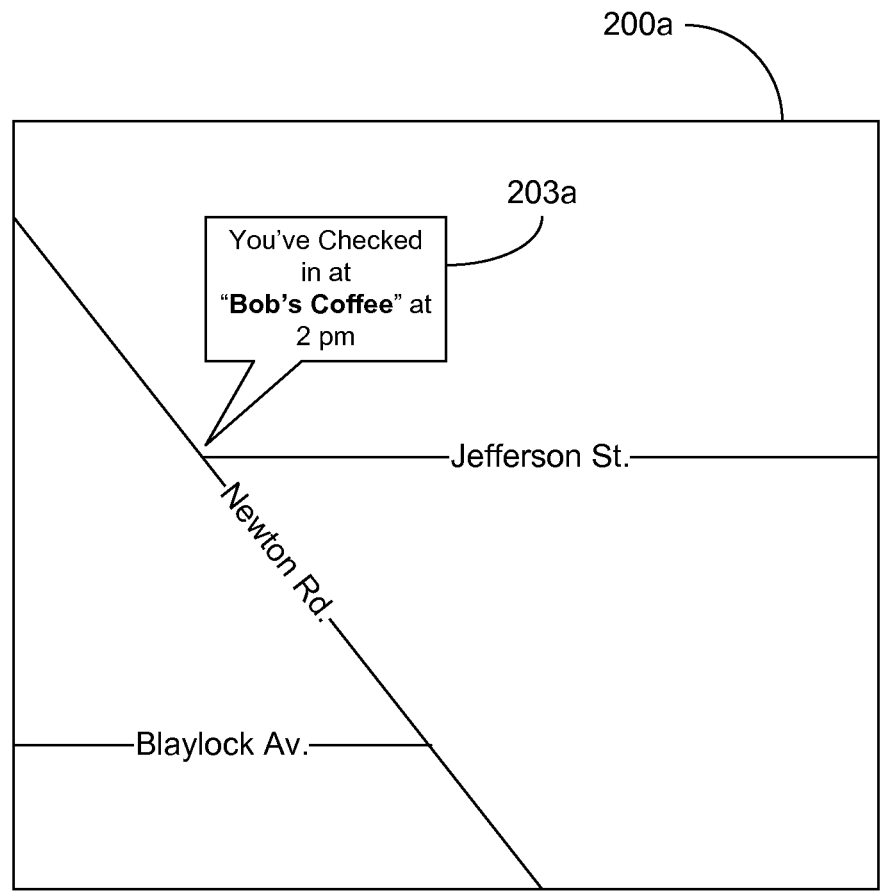
FIGS. 2A and 2B are examples of maps depicting check-ins performed through a check-in service executed in a computing environment in the networked environment of FIG. 1.

Turning now to FIG. 2A, shown is one example of a map 200a depicting a check-in 203a performed through the check-in service 118 (FIG. 1) executed in the computing environment 103 (FIG. 1) in the networked environment 100 (FIG. 1). The map 200a indicates that a user 160 (FIG. 1) has checked in at "Bob's Coffee" at a certain location 163 (FIG. 1) at the time 169 (FIG. 1) of 2 p.m.

Figure 2B:
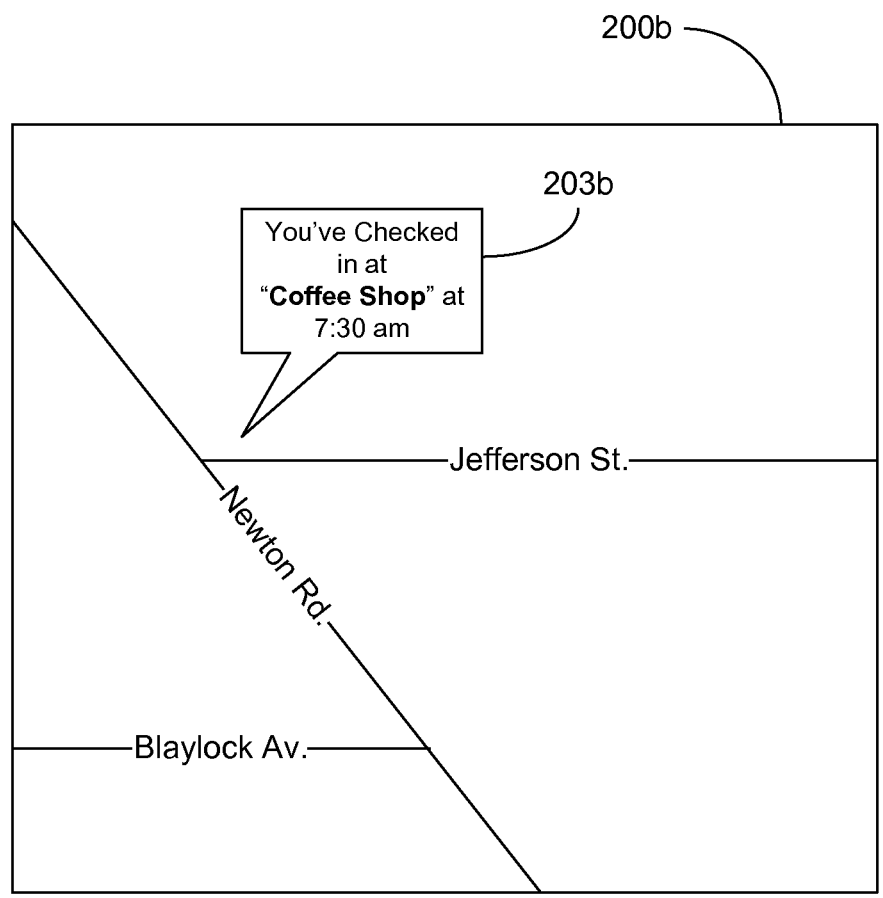

Referring next to FIG. 2B, shown is another example of a map 200b depicting a check-in 203b performed through the check-in service 118 (FIG. 1) executed in the computing environment 103 (FIG. 1) in the networked environment 100 (FIG. 1). The map 200b indicates that a user 160 (FIG. 1) has checked in at "Coffee Shop" at a certain location 163 (FIG. 1) at the time 169 (FIG. 1) of 7:30 a.m. It is noted that the location 163 and the name 166 (FIG. 1) of the check-in 203b are different from that of the check in 203a (FIG. 2A). Check-in 203a has the name 166 of "Bob's Coffee," but check-in 203b has the name 166 of "Coffee Shop," which differs by the removal of the word "Bob's" and the addition of the word "Shop."

Figure 2C:
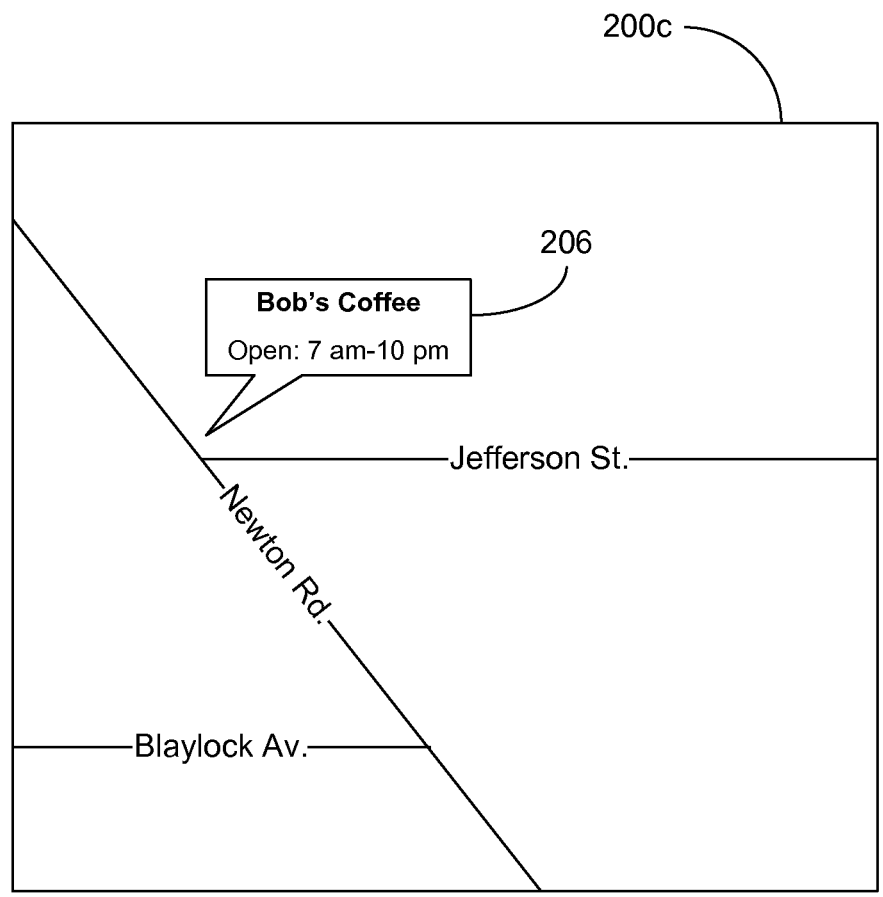
FIG. 2C is an example of a map depicting a public point of interest indication corresponding to a public point of interest identified by a public point of interest discovery service executed in a computing environment in the networked environment of FIG. 1.

Moving on to FIG. 2C, shown is an example of a map 200c depicting a public POI indication 206 corresponding to a public POI 133 (FIG. 1) identified by the public POI discovery service 121 (FIG. 1) executed in the computing environment 103 (FIG. 1) in the networked environment 100 (FIG. 1). The public POI indication 206 indicates a public POI 133 having a name of "Bob's Coffee" at a certain location on the map 200c. The public POI 133 has been identified based at least in part on the check-in 203a (FIG. 2A) and the check-in 203b (FIG. 2B). The representative name "Bob's Coffee" and a representative location have been selected. The representative name may be determined, for example, with reference to the external data 148. Moreover, from the check-in data 130 (FIG. 1) and/or external data 148, hours of operation of 7 am to 10 pm have been determined.

Figure 3:
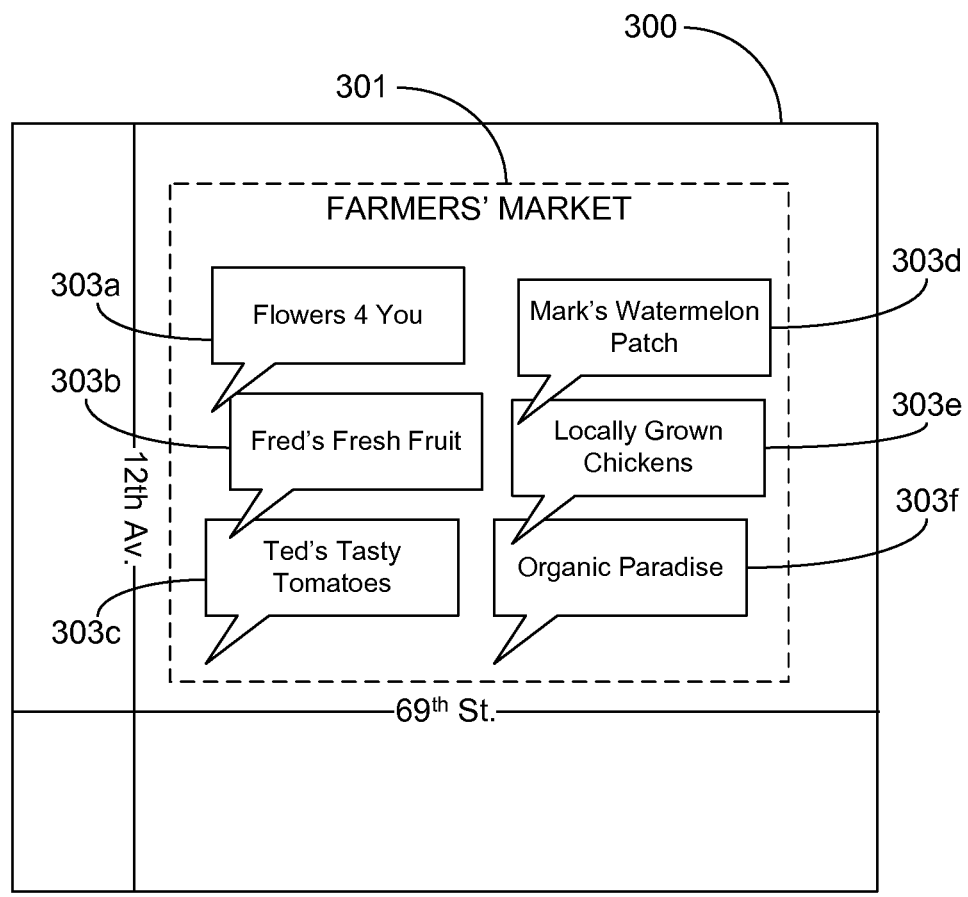
FIG. 3 is an example of a map depicting a composite public point of interest indication corresponding to a composite public point of interest identified by a public point of interest discovery service executed in a computing environment in the networked environment of FIG. 1.

With reference to FIG. 3, shown is an example of a map 300 depicting a composite public POI indication 301 corresponding to a composite public POI 136 (FIG. 1) identified by the public POI discovery service 121 (FIG. 1) executed in the computing environment 103 (FIG. 1) in the networked environment 100 (FIG. 1). The composite public POI 136 corresponds to a "Farmers' Market" and has been identified by the public POI discovery service 121 from six public POIs 133 (FIG. 1). Six public POI indications 303 corresponding to the public POIs 133 are shown. The public POI indication 303a has the name "Flowers 4 You," the public POI indication 303b has the name "Fred's Fresh Fruit," the public POI indication 303c has the name "Ted's Tasty Tomatoes," the public POI indication 303d has the name "Mark's Watermelon Patch," the public POI indication 303e has the name "Locally Grown Chickens," and the public POI indication 303f has the name "Organic Paradise."

All of the public POI indications 303 shown on the map 300 are relatively close to one another and may be identified, for example, as relating to local agriculture. The external data 148 (FIG. 1) may be used by the public POI discovery service 121 to categorize the various names associated with the public POIs 133. In some cases, a category may be supplied by a user as part of the check-in data 130 (FIG. 1). In other cases, the public POIs 133 may be submitted for manual review for categorization. The public POI discovery service 121 may employ user behavior data 145 (e.g., indicating these users 160 (FIG. 1) often shop at farmers' markets, etc.), transaction data 142 (e.g., these public POIs 133 are associated with produce transactions, etc.), and/or other data to infer the existence of a composite public POI 136.

It is noted that the time aspect of public POIs 133 and composite public POIs 136 may be significant. For example, the "Farmer's Market" identified on the map 300 may be relevant only for the weekends during which the "Farmer's Market" is active. During weekdays or other times when the "Farmer's Market" is not open, the same location on the map 300 may be identified as a public POI 133 corresponding to a parking lot.

Figure 4:
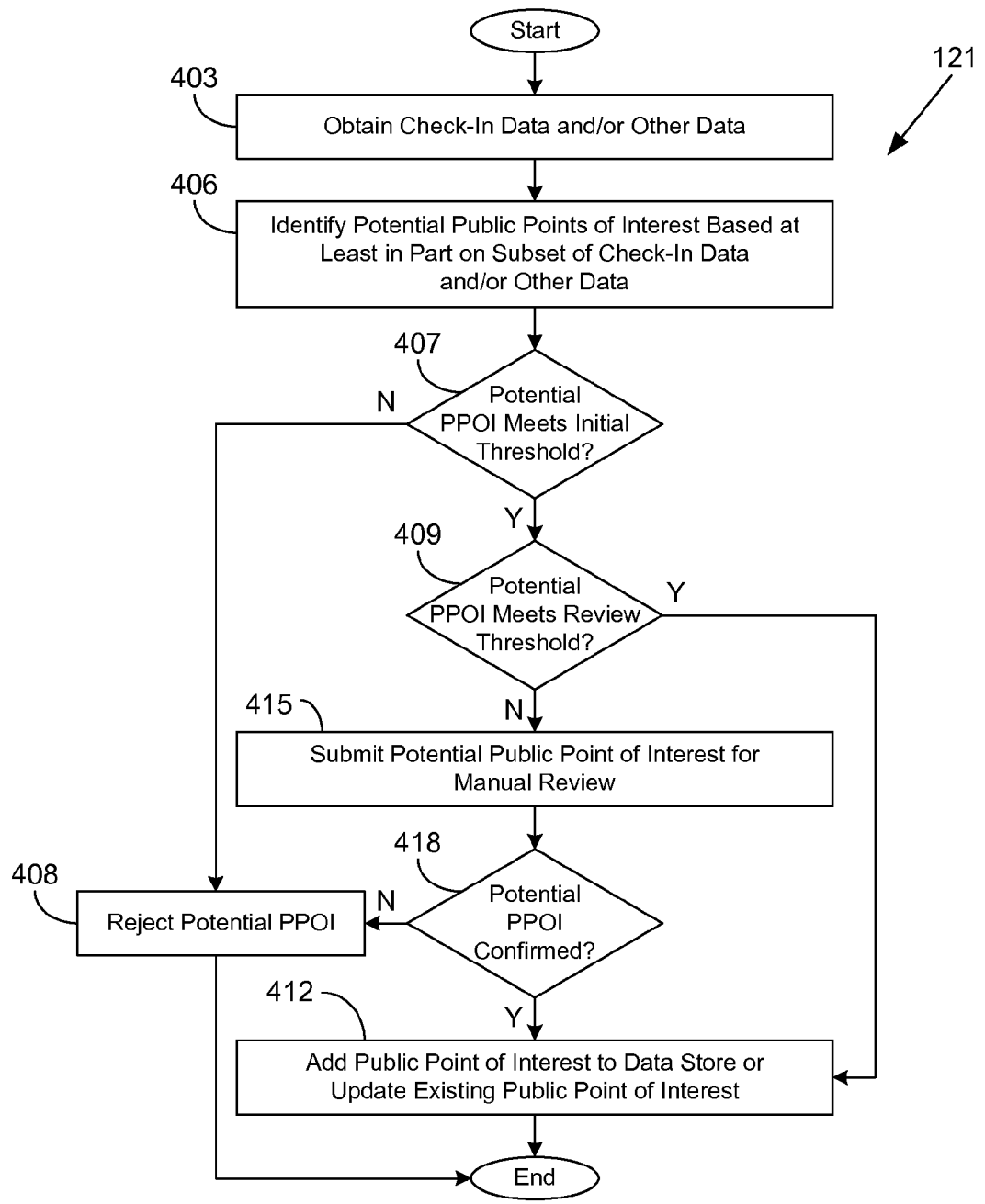
FIGS. 4 and 5 are flowcharts illustrating examples of functionality implemented as portions of a public point of interest discovery service executed in a computing environment in the networked environment of FIG. 1 according to various embodiments of the present disclosure.

Referring next to FIG. 4, shown is a flowchart that provides one example of the operation of a portion of the public POI discovery service 121 according to various embodiments. It is understood that the flowchart of FIG. 4 provides merely an example of the many different types of functional arrangements that may be employed to implement the operation of the portion of the public POI discovery service 121 as described herein. As an alternative, the flowchart of FIG. 4 may be viewed as depicting an example of steps of a method implemented in the computing environment 103 (FIG. 1) according to one or more embodiments.

Beginning with box 403, the public POI discovery service 121 obtains check-in data 130 (FIG. 1) and/or other data. In box 406, the public POI discovery service 121 identifies potential public POIs 133 (FIG. 1) based at least in part on a subset of the check-in data 130, external data 148 (FIG. 1), transaction data 142 (FIG. 1), user behavior data 145 (FIG. 1), and/or other data. In this task, the public POI discovery service 121 may perform various evaluations of criteria and thresholds to determine potential groupings of check-ins that correspond to potential public POIs 133. Such groupings may be associated with a confidence score.

In box 407, the public POI discovery service 121 determines whether the potential public POI 133 has a confidence score that meets or exceeds an initial threshold. If the confidence score does not meet the initial threshold, the public POI discovery service 121 moves to box 408 and rejects the potential public POI 133. Thereafter, the portion of the public POI discovery service 121 ends. If the confidence score does meet or exceed the initial threshold, the public POI discovery service 121 instead continues from box 407 to box 409.

In box 409, the public POI discovery service 121 determines whether the potential public POI 133 has a confidence score that meets or exceeds a threshold indicating whether a manual review is to be performed. If the confidence score meets or exceeds the threshold for performing a manual review, the public POI discovery service 121 moves to box 412. In box 412, the public POI discovery service 121 adds the public POI 133 to the data store 115 (FIG. 1) and/or updates an existing public POI 133. Thereafter, the portion of the public POI discovery service 121 ends.

If, instead, the public POI discovery service 121 determines in box 409 that the potential public POI 133 does not meet the threshold, the public POI discovery service 121 proceeds from box 409 to box 415. In box 415, the public POI discovery service 121 submits the potential public POI 133 to the manual review system 124 (FIG. 1) for manual review. In box 418, the public POI discovery service 121 determines whether the potential public POI 133 has been confirmed as a result of the manual review.

If the potential public POI 133 has been confirmed, the public POI discovery service 121 adds the public POI 133 to the data store 115 (FIG. 1) and/or updates an existing public POI 133. Thereafter, the portion of the public POI discovery service 121 ends. If the potential public POI 133 has not been confirmed, the public POI discovery service 121 rejects the potential public POI 133 in box 408. Thereafter, the portion of the public POI discovery service 121 ends.

Figure 5:
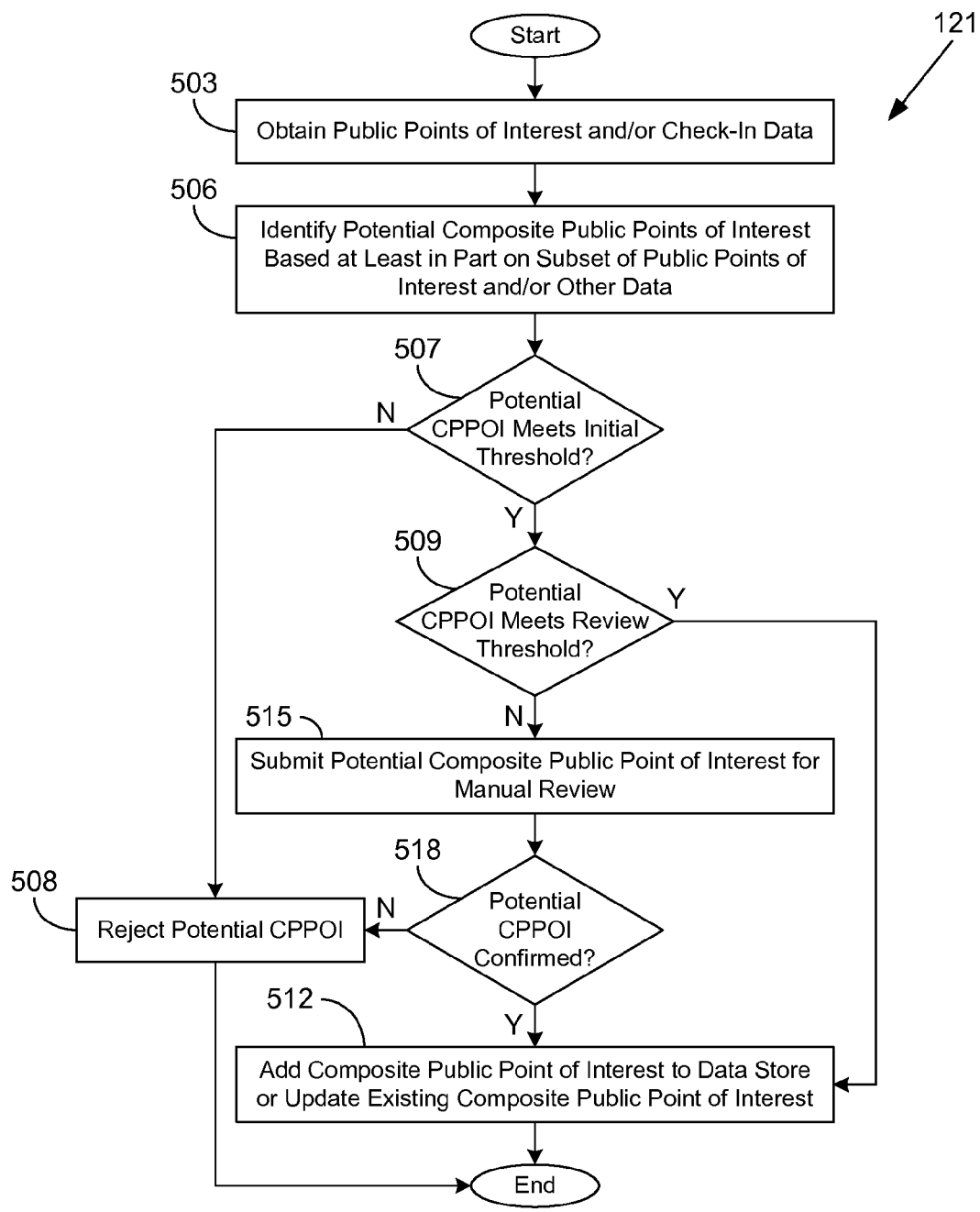

Referring next to FIG. 5, shown is a flowchart that provides one example of the operation of another portion of the public POI discovery service 121 according to various embodiments. It is understood that the flowchart of FIG. 5 provides merely an example of the many different types of functional arrangements that may be employed to implement the operation of the other portion of the public POI discovery service 121 as described herein. As an alternative, the flowchart of FIG. 5 may be viewed as depicting an example of steps of a method implemented in the computing environment 103 (FIG. 1) according to one or more embodiments.

Beginning with box 503, the public POI discovery service 121 obtains data relating to public POIs 133 (FIG. 1) and/or check-in data 130 (FIG. 1). In box 506, the public POI discovery service 121 identifies potential composite public POIs 136 (FIG. 1) based at least in part on a subset of the public POIs 133, external data 148 (FIG. 1), transaction data 142 (FIG. 1), user behavior data 145 (FIG. 1), and/or other data. In this task, the public POI discovery service 121 may perform various evaluations of criteria and thresholds to determine potential groupings of public POIs 133. Such groupings may be associated with a confidence score. Alternatively, the public POI discovery service 121 may process the check-in data 130 directly to determine the existence of composite PPOIs 136 from check-ins.

In box 507, the public POI discovery service 121 determines whether the potential composite public POI 136 has a confidence score that meets or exceeds an initial threshold. If the confidence score does not meet the initial threshold, the public POI discovery service 121 moves to box 508 and rejects the potential composite public POI 136. Thereafter, the portion of the public POI discovery service 121 ends. If the confidence score does meet or exceed the initial threshold, the public POI discovery service 121 instead continues from box 507 to box 509.

In box 509, the public POI discovery service 121 determines whether the potential composite public POI 136 has a confidence score that meets or exceeds a threshold indicating whether a manual review is to be performed. If the confidence score meets or exceeds the threshold indicating a manual review, the public POI discovery service 121 moves to box 512. In box 512, the public POI discovery service 121 adds the composite public POI 136 to the data store 115 (FIG. 1) and/or updates an existing composite public POI 136. Thereafter, the portion of the public POI discovery service 121 ends.

If, instead, the public POI discovery service 121 determines in box 509 that the potential composite public POI 136 does not meet the threshold, the public POI discovery service 121 proceeds from box 509 to box 515. In box 515, the public POI discovery service 121 submits the potential composite public POI 136 to the manual review system 124 (FIG. 1) for manual review. In box 518, the public POI discovery service 121 determines whether the potential composite public POI 136 has been confirmed as a result of the manual review.

If the potential composite public POI 136 has been confirmed, the public POI discovery service 121 adds the composite public POI 136 to the data store 115 and/or updates an existing composite public POI 136. Thereafter, the portion of the public POI discovery service 121 ends. If the potential composite public POI 136 has not been confirmed, the public POI discovery service 121 rejects the potential composite public POI 136 in box 508. Thereafter, the portion of the public POI discovery service 121 ends.

Figure 6:
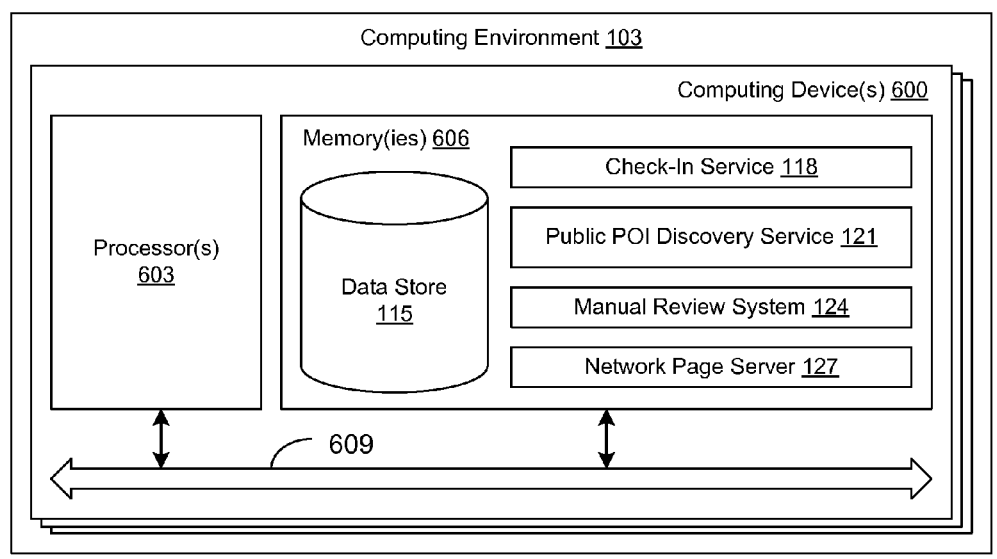
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, the computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the check-in service 118, the public POI discovery service 121, the manual review system 124, the network page server 127, and potentially other applications. Also stored in the memory 606 may be a data store 115 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the check-in service 118, the public POI discovery service 121, the manual review system 124, the network page server 127, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4 and 5 show the functionality and operation of an implementation of portions of the public POI discovery service 121. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4 and 5 show a specific order of execution, it is understood that the order of execution may differ from that which is depicted. For example, the order of execution of two or more blocks may be scrambled relative to the order shown. Also, two or more blocks shown in succession in FIGS. 4 and 5 may be executed concurrently or with partial concurrence. Further, in some embodiments, one or more of the blocks shown in FIGS. 4 and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the check-in service 118, the public POI discovery service 121, the manual review system 124, and the network page server 127, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed in at least one computing device, causes the at least one computing device to at least:
   determine a plurality of different public points of interest, individual ones of the plurality of different public points of interest being determined based at least in part on a comparison of a respective subset of a plurality of points of interest, individual ones of the plurality of points of interest being associated with a respective user and specifying a respective name and a respective geographic location;

generate a composite public point of interest from the plurality of different public points of interest based at least in part on a proximity of corresponding representative geographic locations for the plurality of different public points of interest to one another; and cause a user interface presenting the composite public point of interest to be rendered on a display.

2. The non-transitory computer-readable medium of claim 1, wherein the individual ones of the plurality of different public points of interest are determined further based at least in part on a similarity of the respective names of the respective subset of the plurality of points of interest to one another.

3. The non-transitory computer-readable medium of claim 1, wherein the individual ones of the plurality of different public points of interest are determined further based at least in part on a proximity of the respective geographic locations of the respective subset of the plurality of points of interest to one another.

4. The non-transitory computer-readable medium of claim 1, wherein the individual ones of the plurality of different public points of interest are determined further based at least in part on a number of different users associated with the respective subset of the plurality of points of interest.

5. A system, comprising:
at least one computing device; and
at least one application stored in the at least one computing device, wherein when executed the at least one application causes the at least one computing device to at least:
discover a public point of interest based at least in part on a comparison of a plurality of private points of interest, individual ones of at least some of the plurality of private points of interest being submitted by a respective user of a plurality of users, and individual ones of the plurality of private points of interest specifying a respective name and a respective geographic location.

6. The system of claim 5, wherein the public point of interest is discovered further based at least in part on a similarity of the respective names of a subset of the plurality of private points of interest to one another.

7. The system of claim 5, wherein the public point of interest is discovered further based at least in part on a proximity of the respective geographic locations of a subset of the plurality of private points of interest to one another.

8. The system of claim 5, wherein the public point of interest is discovered further based at least in part on a number of different users associated with a subset of the plurality of private points of interest.

9. The system of claim 5, wherein the individual ones of the plurality of private points of interest further specify a respective time associated with a visit to the respective geographic location, and the public point of interest is discovered further based at least in part on a time window encompassing the respective times for a subset of the plurality of private points of interest.

10. The system of claim 5, wherein when executed the at least one application further causes the at least one computing device to at least submit the public point of interest as a potential public point of interest to a manual review system based at least in part on a manual review threshold.

11. The system of claim 5, wherein when executed the at least one application further causes the at least one computing device to at least generate a composite public point of interest from a plurality of different public points of interest discovered by the at least one application.

12. The system of claim 5, wherein when executed the at least one application further causes the at least one computing device to at least update an existing public point of interest based at least in part on data identifying the plurality of private points of interest.

13. The system of claim 5, wherein when executed the at least one application further causes the at least one computing device to at least determine the public point of interest based at least in part on external name data and the respective names of a subset of the plurality of private points of interest.

14. The system of claim 5, wherein when executed the at least one application further causes the at least one computing device to at least obtain data identifying at least one of the plurality of private points of interest by way of a check-in application executed in a mobile computing device, wherein the respective geographic location for the at least one of the plurality of private points of interest is determined by way of a location-finding device in the mobile computing device.

15. A method, comprising:
receiving, via at least one of one or more computing devices, data identifying a plurality of private points of interest, individual ones of at least some of the plurality of private points of interest being associated with a respective user of a plurality of users, and individual ones of the plurality of private points of interest specifying a respective name and a respective geographic location; and
discovering, via at least one of the one or more computing devices, a public point of interest based at least in part on one or more of: a similarity of the respective names of a subset of the plurality of private points of interest to one another, a proximity of the respective geographic locations of the subset of the plurality of private points of interest to one another, or a number of different users associated with the subset of the plurality of private points of interest.

16. The method of claim 15, further comprising generating, via at least one of the one or more computing devices, a composite public point of interest from the data identifying the plurality of private points of interest.

17. The method of claim 15, wherein discovering the public point of interest is further based at least in part on a comparison of external name data with the respective names of the subset of the plurality of private points of interest.

18. The method of claim 15, further comprising receiving, via at least one of the one or more computing devices, data identifying at least one of the plurality of private points of interest by way of at least one network page served up by a network site, wherein the respective geographic location for the at least one of the plurality of private points of interest is indicated by a user relative to a map included in the at least one network page.

19. The method of claim 15, further comprising receiving, via at least one of the one or more computing devices, data identifying at least one of the plurality of private points of interest by way of a check-in application executed in a mobile computing device, wherein the respective geographic location for the at least one of the plurality of private points of interest is determined by way of a location-finding device in the mobile computing device.

20. The method of claim 15, further comprising submitting, via at least one of the one or more computing devices, the public point of interest as a potential public point of interest to a manual review system based at least in part on a manual review threshold, wherein the manual review system is configured to provide at least one image of a representative geographic location for the potential public point of interest for a manual review.

* * * * *